United States Patent
Leigh et al.

(10) Patent No.: US 10,362,417 B2
(45) Date of Patent: Jul. 23, 2019

(54) ADJUSTABLE FIXATION DEVICE HAVING REDUCED INFECTION

(71) Applicants: C. Roger Leigh, East Ryde (AU); Bruno Onkelinx, Blanden (BE)

(72) Inventors: C. Roger Leigh, East Ryde (AU); Bruno Onkelinx, Blanden (BE)

(73) Assignee: Cochlear Limited, Macquarie University, NSW (AU)

( * ) Notice: Subject to any disclaimer, the term of this patent is extended or adjusted under 35 U.S.C. 154(b) by 1525 days.

(21) Appl. No.: 13/596,568

(22) Filed: Sep. 28, 2012

(65) Prior Publication Data

US 2014/0094646 A1    Apr. 3, 2014

(51) Int. Cl.
*H04R 25/00* (2006.01)
*B29L 31/00* (2006.01)
*B29C 45/14* (2006.01)

(52) U.S. Cl.
CPC ...... *H04R 25/604* (2013.01); *B29C 45/14467* (2013.01); *B29L 2031/7532* (2013.01); *H04R 2225/67* (2013.01)

(58) Field of Classification Search
CPC ........ B29L 2031/7532; H04R 2225/67; H04R 25/604; H04R 25/00–75; H04R 2225/00–83; H04R 2460/00–17; B29C 45/14467
USPC ............. 600/25; 264/239, 279; 128/897–899
See application file for complete search history.

(56) References Cited

U.S. PATENT DOCUMENTS

| | | | | |
|---|---|---|---|---|
| 4,822,368 A | * | 4/1989 | Collier | A61F 2/30742 128/898 |
| 4,892,552 A | * | 1/1990 | Ainsworth | A61F 2/30965 623/23.34 |
| 6,261,223 B1 | * | 7/2001 | Brillhart et al. | 600/25 |
| 6,325,755 B1 | * | 12/2001 | Bushek | H04R 25/606 600/25 |
| 6,332,534 B1 | * | 12/2001 | Hammett | 206/366 |
| 6,398,717 B1 | | 6/2002 | Leysieffer et al. | |
| 6,432,141 B1 | * | 8/2002 | Stocks | A61F 2/30742 623/22.13 |
| 6,540,661 B1 | | 4/2003 | Müller | |
| 6,705,958 B2 | | 3/2004 | Hayashi et al. | |
| 2004/0264725 A1 | * | 12/2004 | Madsen et al. | 381/328 |
| 2007/0260140 A1 | * | 11/2007 | Solar | A61B 90/39 600/426 |
| 2009/0076605 A1 | * | 3/2009 | Linares | 623/14.12 |
| 2009/0275945 A1 | * | 11/2009 | Makower | A61B 17/58 606/60 |
| 2009/0306458 A1 | * | 12/2009 | Parker et al. | 600/25 |
| 2010/0010569 A1 | * | 1/2010 | Parker et al. | 607/57 |
| 2012/0016180 A1 | * | 1/2012 | Abel | H04R 17/00 600/25 |
| 2012/0022647 A1 | | 1/2012 | Leigh et al. | |

* cited by examiner

*Primary Examiner* — Thaddeus B Cox
(74) *Attorney, Agent, or Firm* — Pilloff & Passino LLP; Martin J. Cosenza

(57) ABSTRACT

Components and portions of components of a hearing prosthesis encapsulated in a microorganism-barrier membrane. Methods and apparatus are described for implanting hearing prosthesis components in precise locations, and maintaining the locations, with at least some components or portions of components encapsulated in a microorganism-barrier membrane.

31 Claims, 12 Drawing Sheets

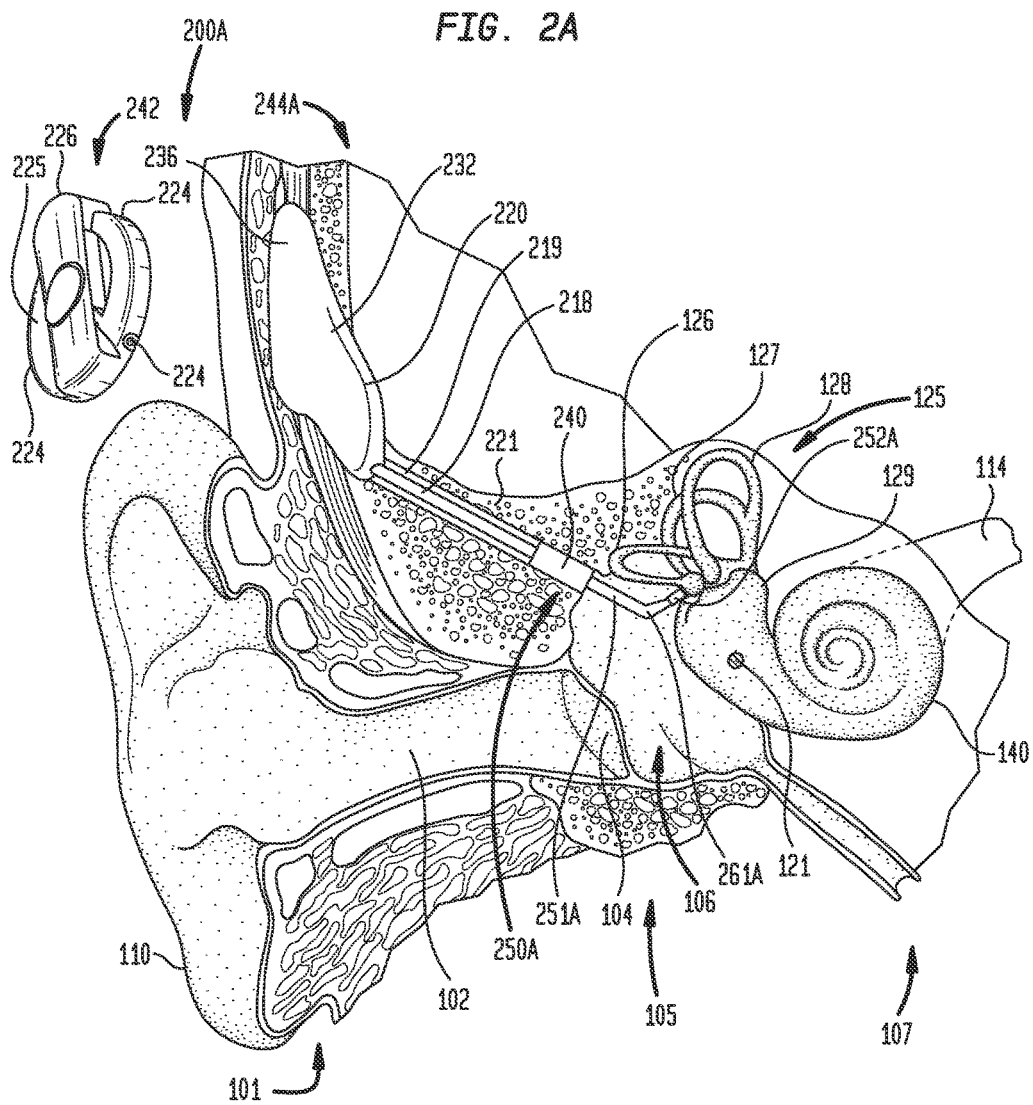

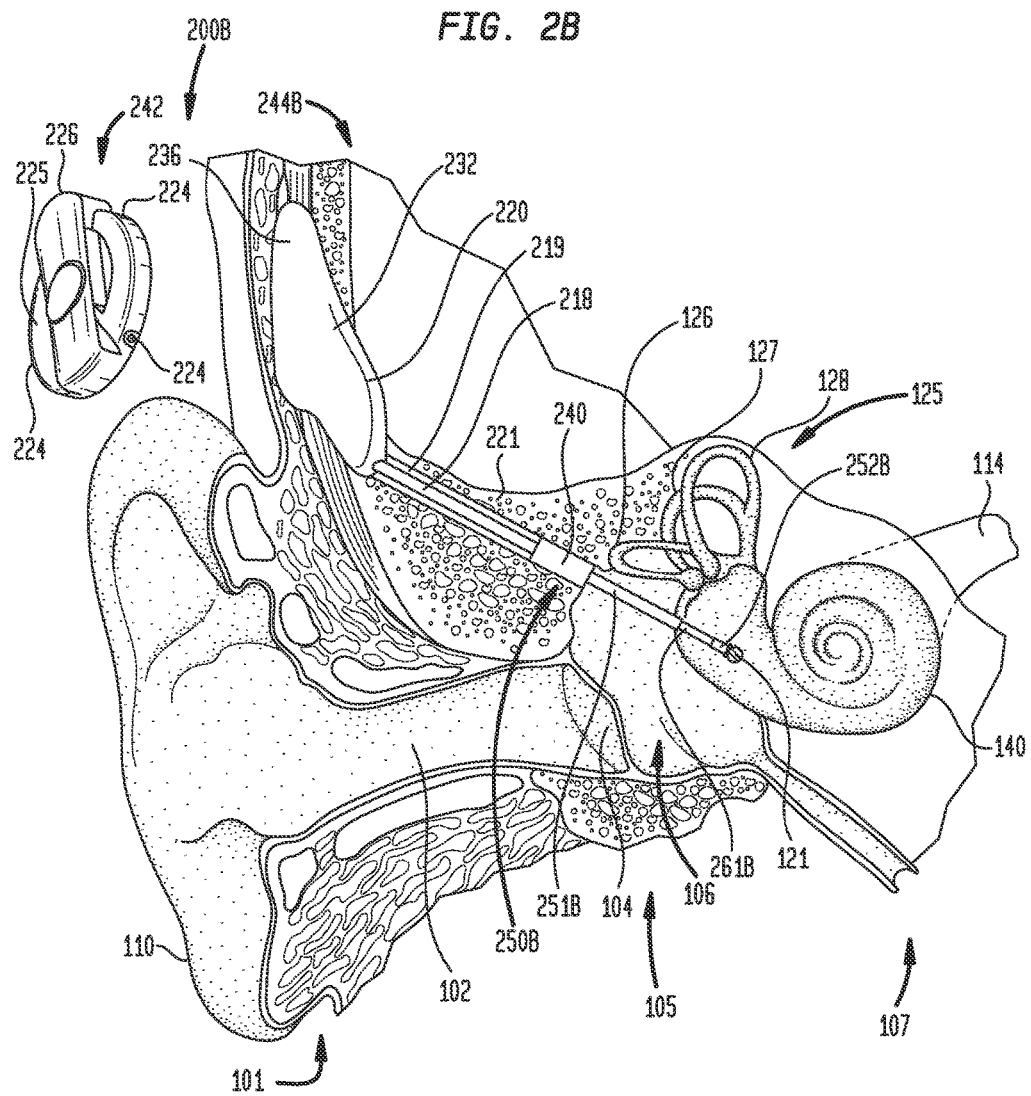

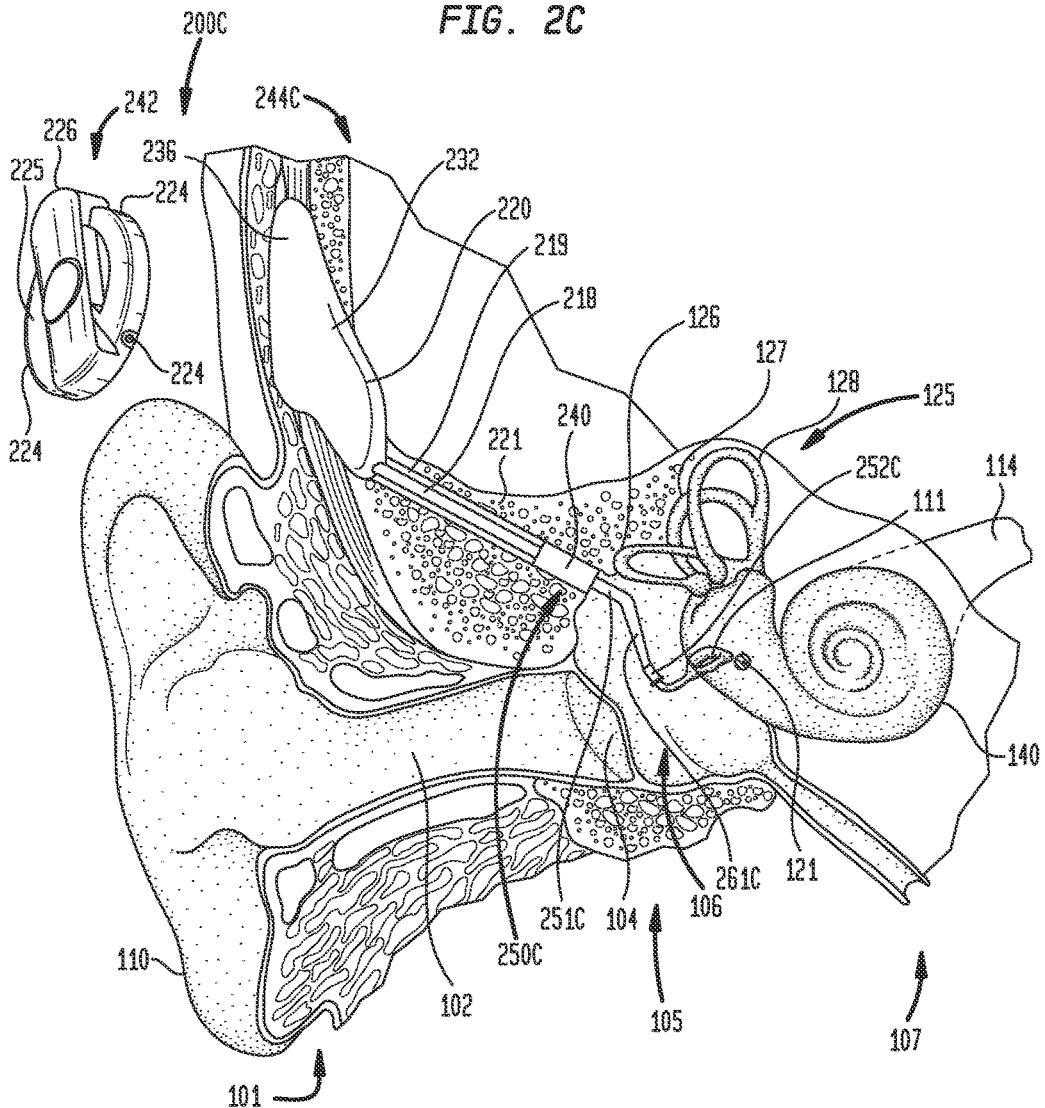

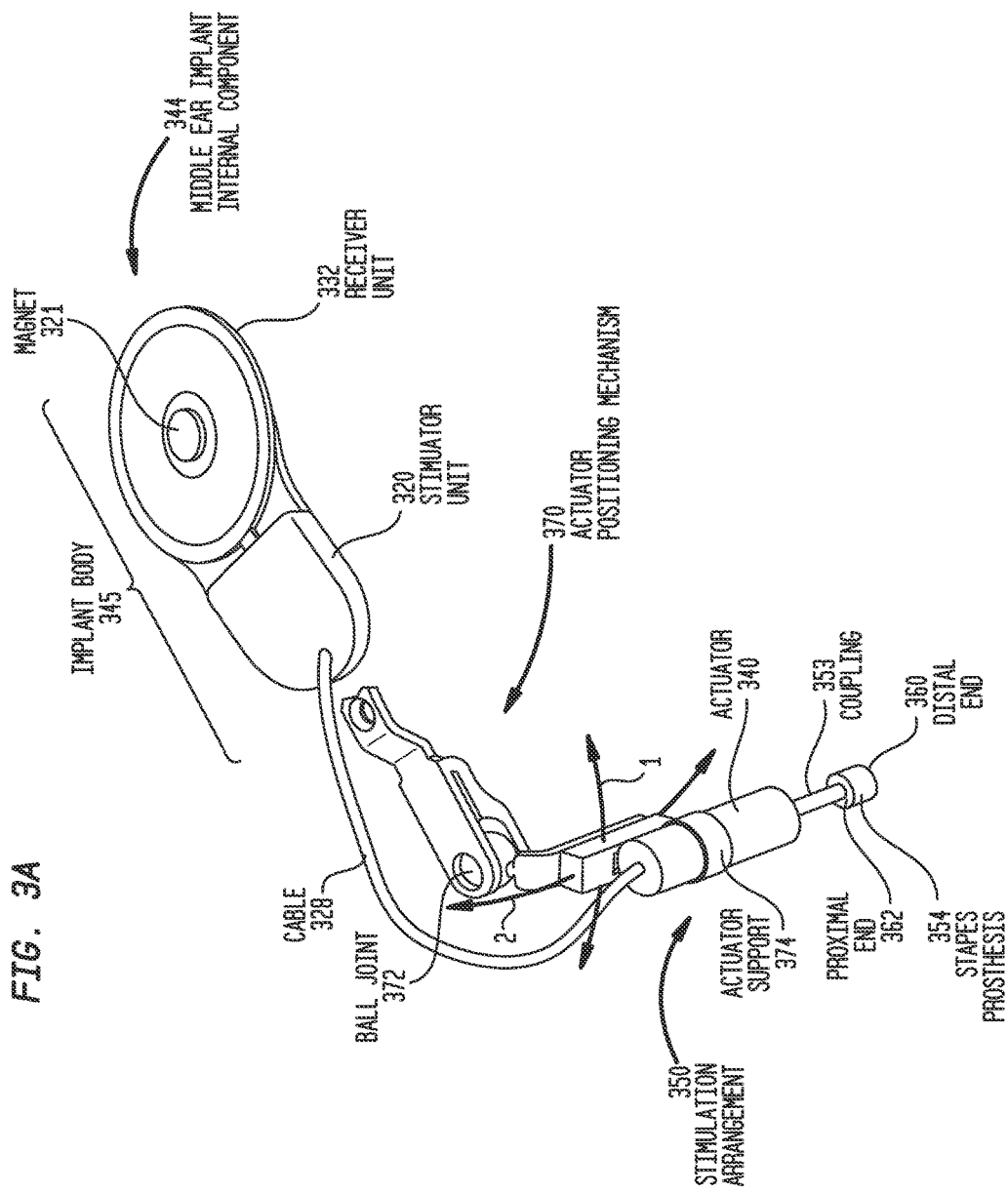

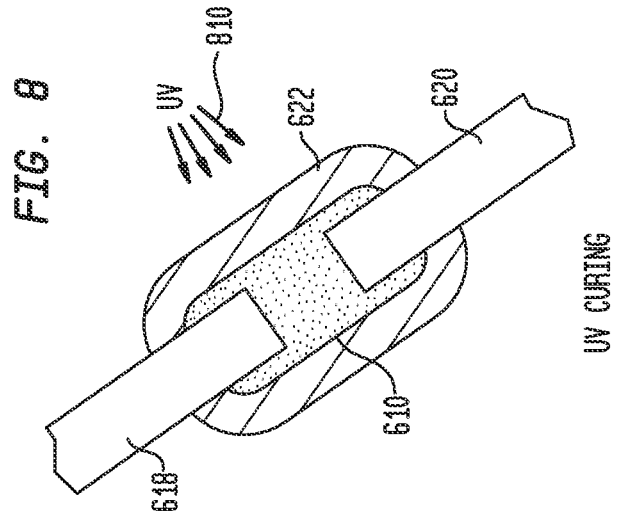
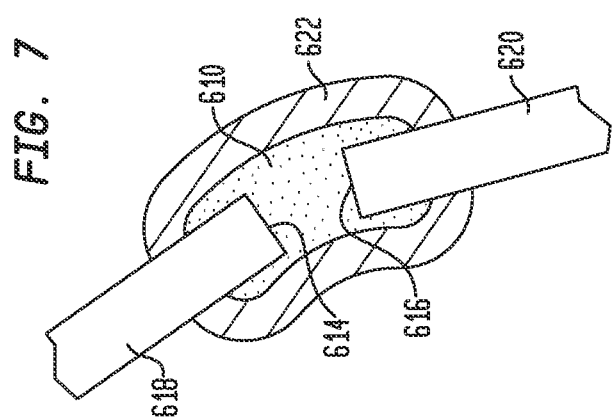

EPOXY CURING AGENT
IN GLASS VIAL

VIAL BROKEN BY
APPLIED FORCE

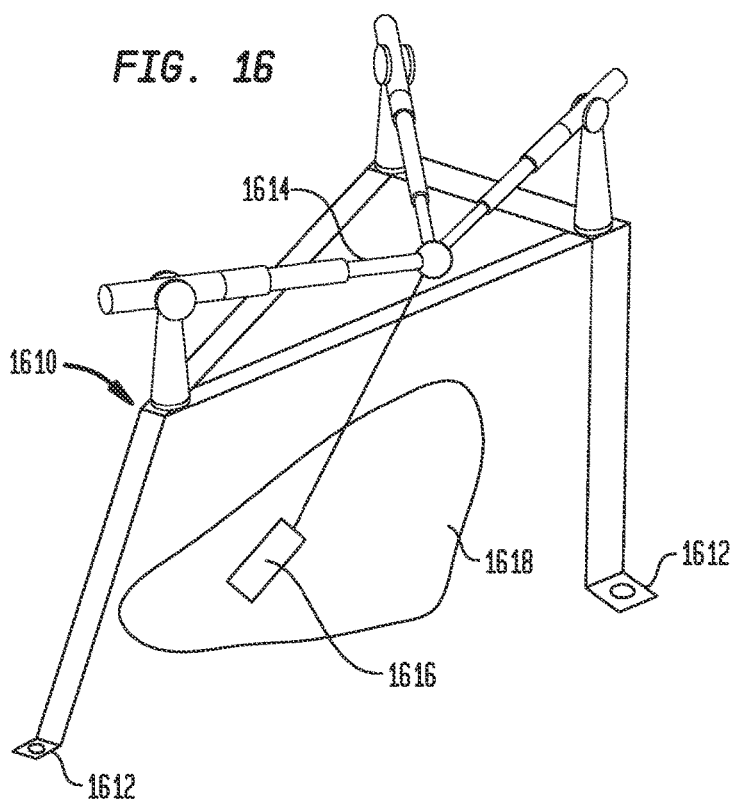

ADJUSTABLE FIXATION DEVICE HAVING REDUCED INFECTION

BACKGROUND

This invention relates generally to implantable medical devices, and more particularly, to an implantable adjustable fixation device having reduced infection.

Implantable medical devices comprise one or more components which are temporarily or permanently implanted in a patient or recipient. Examples of such medical devices are implantable hearing prostheses which address hearing loss in the recipient. There are generally two types of hearing loss, conductive and sensorineural. Sensorineural hearing loss is due to the absence or destruction of the cochlear hair cells which transduce sound into nerve impulses. Various hearing prostheses have been developed to provide individuals suffering from sensorineural hearing loss with the ability to perceive sound. For example, cochlear implants have an electrode assembly that is implanted in the cochlea. In operation, electrical stimuli are delivered to the auditory nerve via the electrode assembly, thereby bypassing the inoperative hair cells to cause a hearing percept.

Conductive hearing loss occurs when the natural mechanical pathways that provide sound in the form of mechanical energy to cochlea are impeded, for example, by damage to the ossicular chain or ear canal. For a variety of reasons, individuals having conductive hearing loss are typically not candidates for a cochlear implant. Such individuals typically receive an acoustic hearing aid. Hearing aids rely on principles of air conduction to transmit acoustic signals to the cochlea. In particular, hearing aids amplify received sound and transmit the amplified sound into the ear canal. This amplified sound reaches the cochlea in the form of mechanical energy, causing motion of the perilymph and stimulation of the auditory nerve.

Unfortunately, not all individuals suffering from conductive hearing loss are able to derive suitable benefit from hearing aids. For example, some individuals are prone to chronic inflammation or infection of the ear canal. Other individuals have malformed or absent outer ear and/or ear canals resulting from a birth defect, or as a result of medical conditions such as Treacher Collins syndrome or Microtia.

For these and other individuals, another type of hearing prosthesis has been developed in recent years. This hearing prosthesis, commonly referred to as a middle ear implant, converts received sound into a mechanical force that is applied to the ossicular chain or directly to the cochlea via an actuator implanted in or adjacent to the middle ear cavity.

SUMMARY

The terms "invention," "the invention," "this invention," "the present invention," "disclosure," "the disclosure," "this disclosure" and "the present disclosure" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

The disclosed subject matter improves efficacy of implantable medical devices such as cochlear stimulator devices and their implantation by providing adjustable couplings between actuators and other middle ear components or between an individual's anatomy and an actuator or other prosthetic component, and by providing improved methods and apparatus for implanting such devices.

In one embodiment, mechanical couplings are covered with a smooth flexible membrane that prevents microorganism contact, attachment to and/or growth on the coupling surfaces. Such a membrane covering can be, among other alternatives, silicone tubing attached to structures attached to the couplings or silicone moldings molded to or adhesively attached to such structures.

The membrane may include apertures if needed to provide access for a screw driver or other tool to adjust the coupling.

Other embodiments of the membrane-covered coupling can use a universal joint or other joint structure that can be manipulated into a desired position and then locked without penetration of the membrane, such as by the application of force.

In another embodiment, apparatus ends to be coupled in a particular relationship once the remote ends are properly positioned are initially movable but are then fixed in position by a chemical/mechanical means. For instance, the joint-covering membrane can contain a hardenable fluid such as paste or liquid epoxy that is cured by use of ultraviolet light, mixing of epoxy components or another means once the apparatus ends are in the positions desired. Solidification of the epoxy can fix the positions of portions of rods or other components free to move relative to each other before solidification. Solidification of epoxy or another adhesive or other material can also freeze components of an adjustment mechanism encapsulated in a membrane also containing the epoxy, adhesive or other material.

BRIEF DESCRIPTION OF THE DRAWINGS

Embodiments of the disclosed subject matter are described below with reference to the attached drawings, in which:

FIG. 2A is a perspective view of an exemplary direct acoustic cochlear stimulator implanted in accordance with embodiments of the present technology;

FIG. 2B is a perspective view of an exemplary direct acoustic cochlear stimulator implanted in accordance with another embodiment of the present technology;

FIG. 2C is a perspective view of an exemplary direct acoustic cochlear stimulator implanted in accordance with yet another embodiment of the present technology;

FIG. 3 is a schematic diagram depicting an exemplary implantable component assembly in accordance with an embodiment of the present technology;

FIG. 3A is a perspective view of an exemplary internal component of a middle ear implant;

FIG. 6 is a schematic diagram, partially in section, of a membrane capsule containing apparatus ends and uncured epoxy;

FIG. 7 is another view of the membrane capsule of FIG. 6 with the apparatus ends flexed;

FIG. 8 is a schematic depiction of the membrane capsule and apparatus ends of FIG. 6 during curing of the epoxy with ultraviolet light;

FIG. 16 is a schematicized perspective view of an embodiment of an actuator positioning apparatus.

DETAILED DESCRIPTION

Subject matter is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Figure 1:
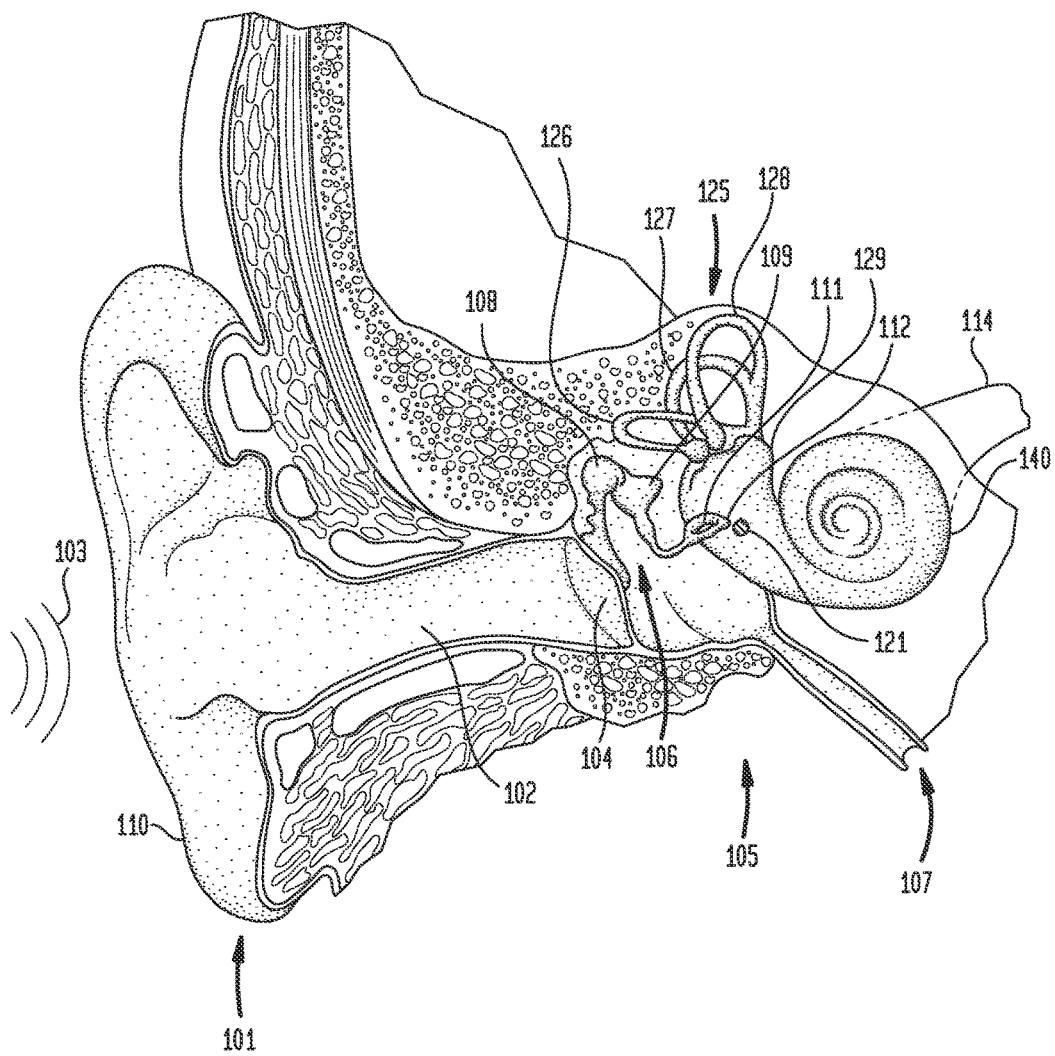
FIG. 1 is perspective view of a human ear.

FIG. 1 is perspective view of a human skull showing the anatomy of the human ear. As shown in FIG. 1, the human ear comprises an outer ear 101, a middle ear 105 and an inner ear 107. In a fully functional ear, outer ear 101 comprises an auricle 110 and an ear canal 102. An acoustic pressure or sound wave 103 is collected by auricle 110 and channeled into and through ear canal 102. Disposed across the distal end of ear cannel 102 is a tympanic membrane 104 which vibrates in response to sound wave 103. This vibration is coupled to oval window or fenestra ovalis 112, which is adjacent round window 121. This vibration is coupled through three bones of middle ear 105, collectively referred to as the ossicles 106 and comprising the malleus 108, the incus 109 and the stapes 111. Bones 108, 109 and 111 of middle ear 105 serve to filter and amplify sound wave 103, causing oval window 112 to articulate, or vibrate in response to the vibration of tympanic membrane 104. This vibration sets up waves of fluid motion of the perilymph within cochlea 140. Such fluid motion, in turn, activates hair cells (not shown) inside cochlea 140. Activation of the hair cells causes nerve impulses to be generated and transferred through the spiral ganglion cells (not shown) and auditory nerve 114 to the brain (also not shown) where they cause a hearing percept.

As shown in FIG. 1, semicircular canals 125 are three half-circular, interconnected tubes located adjacent cochlea 140. Vestibule 129 provides fluid communication between semicircular canals 125 and cochlea 140. The three canals are the horizontal semicircular canal 126, the posterior semicircular canal 127, and the superior semicircular canal 128. The canals 126, 127 and 128 are aligned approximately orthogonally to one another. Specifically, horizontal canal 126 is aligned roughly horizontally in the head, while the superior 128 and posterior canals 127 are aligned roughly at a 45 degree angle to a vertical through the center of the individual's head.

Each canal is filled with a fluid called endolymph and contains a motion sensor with tiny hairs (not shown) whose ends are embedded in a gelatinous structure called the cupula (also not shown). As the orientation of the skull changes, the endolymph is forced into different sections of the canals. The hairs detect when the endolymph passes thereby, and a signal is then sent to the brain. Using these hair cells, horizontal canal 126 detects horizontal head movements, while the superior 128 and posterior 127 canals detect vertical head movements.

FIG. 2A is a perspective view of an example of a direct acoustic cochlear stimulator 200A. Direct acoustic cochlear stimulator 200A comprises an external component 242 that is directly or indirectly attached to the body of the recipient, and an internal component 244A that is temporarily or permanently implanted in the recipient. External component 242 typically comprises two or more sound input elements, such as microphones 224, for detecting sound, a sound processing unit 226, a power source (not shown), and an external transmitter unit 225. External transmitter unit 225 comprises an external coil (not shown). Sound processing unit 226 processes the output of microphones 224 and generates encoded data signals which are provided to external transmitter unit 225. For ease of illustration, sound processing unit 226 is shown detached from the recipient.

Internal component 244A comprises an internal receiver unit 232, a stimulator unit 220, and a stimulation arrangement 250A in electrical communication with stimulator unit 220 via cable 218 extending thorough artificial passageway 219 in mastoid bone 221. Internal receiver unit 232 and stimulator unit 220 are hermetically sealed within a biocompatible housing, and are sometimes collectively referred to as a stimulator/receiver unit.

Internal receiver unit 232 comprises an internal coil (not shown), and optionally, a magnet (also not shown) fixed relative to the internal coil. The external coil transmits electrical signals (i.e., power and stimulation data) to the internal coil via a radio frequency (RF) link. The internal coil is typically a wire antenna coil comprised of multiple turns of electrically insulated platinum or gold wire. The electrical insulation of the internal coil is provided by a flexible silicone molding (not shown). In use, implantable receiver unit 232 is positioned in a recess of the temporal bone adjacent auricle 110.

In the illustrative embodiment of FIG. 2A, ossicles 106 have been explanted. However, it should be appreciated that stimulation arrangement 250A may be implanted without disturbing ossicles 106.

Stimulation arrangement 250A comprises an actuator 240, a stapes prosthesis 252A and a coupling element 251A which includes an artificial incus 261A. Actuator 240 is osseointegrated to mastoid bone 221, or more particularly, to the interior of artificial passageway 219 formed in mastoid bone 221.

In the embodiment shown in FIG. 2A, stimulation arrangement 250A is implanted and/or configured such that a portion of stapes prosthesis 252A abuts an opening in one of the semicircular canals 125. For example, in the illustrative embodiment, stapes prosthesis 252A abuts an opening in horizontal semicircular canal 126. In alternative embodiments, stimulation arrangement 250A is implanted such that stapes prosthesis 252A abuts an opening in posterior semicircular canal 127 or superior semicircular canal 128.

As noted above, a sound signal is received by microphone(s) 224, processed by sound processing unit 226, and transmitted as encoded data signals to internal receiver 232. Based on these received signals, stimulator unit 220 generates drive signals which cause actuation of actuator 240. The mechanical motion of actuator 240 is transferred to stapes prosthesis 252A such that a wave of fluid motion is generated in horizontal semicircular canal 126. Because, vestibule 129 provides fluid communication between the semicircular canals 125 and the median canal, the wave of fluid motion continues into median canal, thereby activating the hair cells of the organ of Corti. Activation of the hair cells causes appropriate nerve impulses to be generated and transferred through the spiral ganglion cells (not shown) and auditory nerve 114 to cause a hearing percept in the brain.

FIG. 2B shows a stimulation arrangement 250B comprising actuator 240, a stapes prosthesis 252B and a coupling element 251B which includes artificial incus 261B that couples the actuator to the stapes prosthesis. In this embodiment, stimulation arrangement 250B is implanted and/or configured such that a portion of stapes prosthesis 252B abuts round window 121 of cochlea 140.

The embodiments of FIGS. 2A and 2B are exemplary embodiments of a middle ear implant that provides mechanical stimulation directly to cochlea 140. Other types of middle ear implants provide mechanical stimulation to middle ear 105. For example, middle ear implants may provide mechanical stimulation to a bone of ossicles 106, such to incus 109 or stapes 111. FIG. 2C depicts an exemplary embodiment of a middle ear implant 200C having a stimulation arrangement 250C comprising actuator 240 and a coupling element 251C. Coupling element 251C includes a stapes prosthesis 252C and an artificial incus 261C which couples the actuator to the stapes prosthesis. In this embodiment, stapes prosthesis 252C abuts stapes 111.

As will be appreciated by reference to FIG. 2A, actuator 240 is located in passageway 219, and the position of actuator 240 is therefore largely limited by the location of passageway 219. At the same time, stapes prosthesis 252A is to be positioned very precisely on semicircular canal 126. The same is true of other prostheses attached to or contacting other middle ear 105 structures. For instance, stapes prosthesis 252B illustrated in FIG. 2B is to be positioned very precisely on the round window 121 of cochlea 140, and stapes prosthesis 252C, and artificial incus 261C are to be very specifically positioned relative to the stapes 111 shown in FIG. 2C.

Since the precise size and anatomy of the inner ear and cranium vary from individual to individual, it is desirable to provide the capability to precisely adjust the position of the stapes prosthesis during implantation.

FIG. 3A is a perspective view of an exemplary internal component 344 of a middle ear implant which generally represents internal components 244 described above. Internal component 344 comprises an internal receiver unit 332, a stimulator unit 320, and a stimulation arrangement 350. As shown, receiver unit 332 comprises an internal coil (not shown), and preferably, a magnet 321 fixed relative to the internal coil. As would be appreciated, stimulator unit 320 is typically hermetically sealed within a biocompatible housing.

Stimulator unit 320 is connected to stimulation arrangement 350 via a cable 328. Stimulation arrangement 350 comprises an actuator 340, a stapes prosthesis 354 and a coupling element 353. A proximal end of stapes prosthesis 354 is connected to actuator 340 via coupling element 353, and in operation, actuator 340 vibrates stapes prosthesis 354. Middle ear implant internal component 344 further includes actuator positioning mechanism 370 for positioning actuator 340 and thereby positioning stapes prosthesis 354. The actuator positioning mechanism may be attached to a fixation system (not shown) secured directly to a bone. In one embodiment, the fixation system comprising a cross-shaped component. The fixation mechanism may be secured via one or more bone screws drilled into the recipient's skull through apertures located towards the distal ends of the cross-shaped component. The positioning mechanism may contain one or more position/orientation adjustment components each of which commits relative adjustments in position and/or orientation. In FIG. 3A, an position/orientation adjustment component in the form of a ball joint 372 permits the articulation of actuator 340 relative to middle ear implant internal component 344. Actuator support 374 is depicted as being in the form of a collar, and receives and otherwise holds actuator 340 therein, and thus holds the actuator to the actuator positioning mechanism 370. Actuator support 374 allows for longitudinal positioning of the actuator 340 within the actuator support 374.

As may be appreciated by reference to FIG. 3A, the position of stapes prosthesis 354 may be adjusted by moving actuator 340 and thereby moving stapes prosthesis 354 because it is rigidly coupled to actuator 340 by coupling 353.

Actuator positioning mechanisms can be very effective, but many of these actuator positioning mechanisms have a position/orientation adjustment component or other component that contains numerous small recesses and crevices. These are structures on which microorganisms can accumulate, become attached and, for example, form biofilms. Such conditions could possibly contribute to undesirable effects such as infections.

Figure 3B:
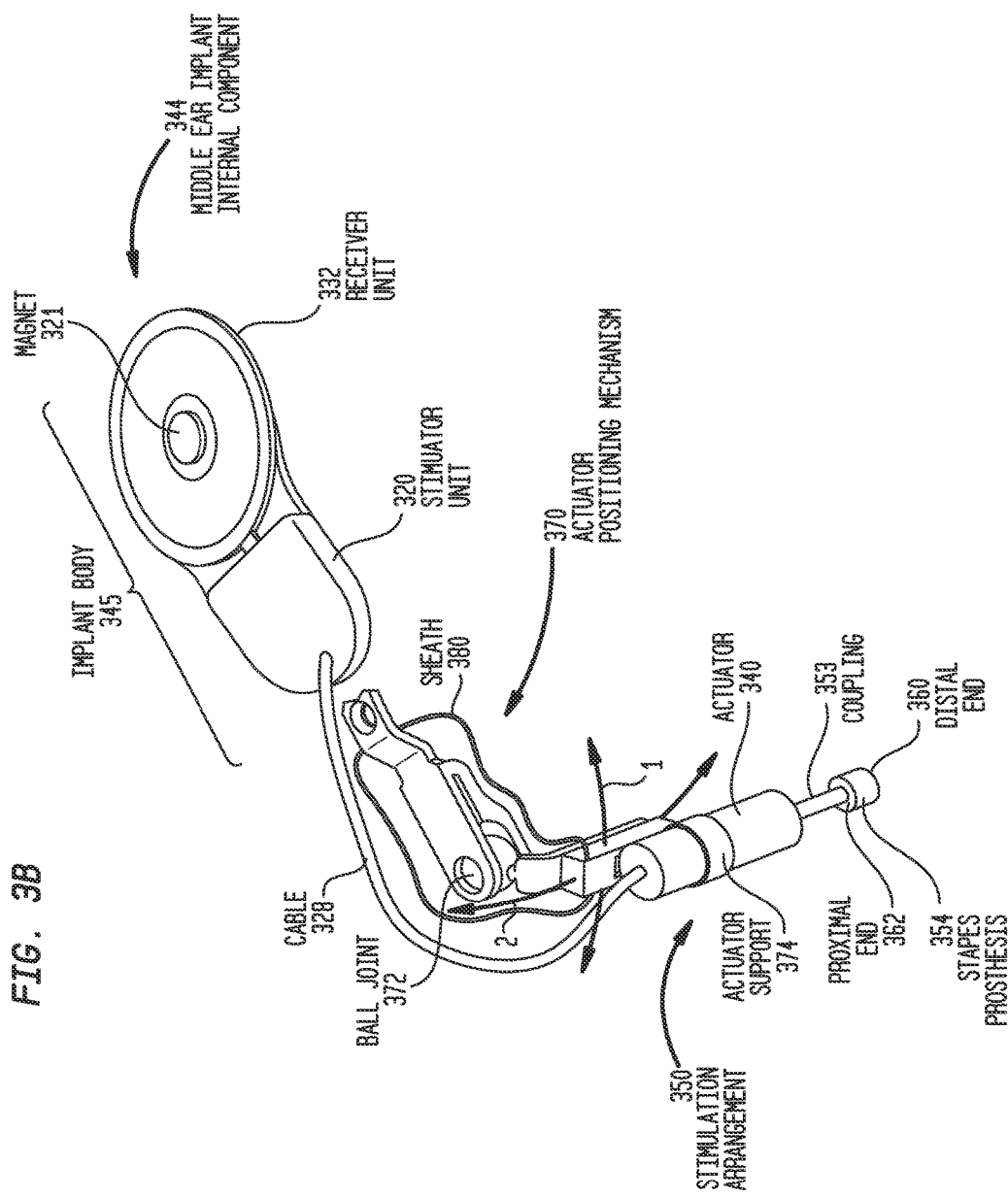
FIG. 3B is the perspective view of an exemplary internal component of a middle ear implant shown in FIG. 3A with an embodiment of a sheath or membrane encapsulating a component of the implant in accordance with the teachings of the present invention.

FIG. 3B is a perspective view of ball joint 372 of actuator positioning member 370 encapsulated by a membrane 380, also referred to herein as a sheath. In an alternative embodiment, sheath 380 can encapsulate both ball joint 372 and actuator support 374. Sheath 380 comprises an internal surface proximate to the encapsulated position/orientation adjustment component, and an external surface. In some embodiments, the external surface is substantially smooth to inhibit microorganisms. In other embodiments, the external surface of sheath 380 may be otherwise configured and/or treated to inhibit microorganisms. In yet another alternative embodiment, a sheath 380 may be divided into multiple sheathes (collectively referred to as sheath 380), each configured to encapsulate a different part of the position/orientation adjustment component and, to interoperate with each other as necessary to provide the desired encapsulation of the component. In another embodiment, the sheath 380 is a polymeric tube. Suitable polymers include, but are not limited to, silicone, polyurethane, and PTFE. The tube can be substantially conformal to the surfaces of the position/orientation adjustment component. It should be appreciated that in those applications which have multiple position/orientation adjustment components, a single sheath may be configured to encapsulate both such components, or multiple sheaths each configured to encapsulate one such component, may be implemented.

In a further embodiment, the internal surface of sheath 380 can be substantially attached to the position/orientation adjustment component(s). For example, sheath 380 may comprise a molding configured to conform to the surfaces of the encapsulated component. In other embodiments the sheath may additionally or alternatively be attached to the surfaces of the encapsulated component.

In another embodiment, sheath 380 further contains a malleable material. The malleable material may comprise a liquid such as un-cured silicone. When the encapsulated component has been positioned in the desired orientation, the malleable material can be hardened, for example by being cured with ultraviolet light.

Figure 4:
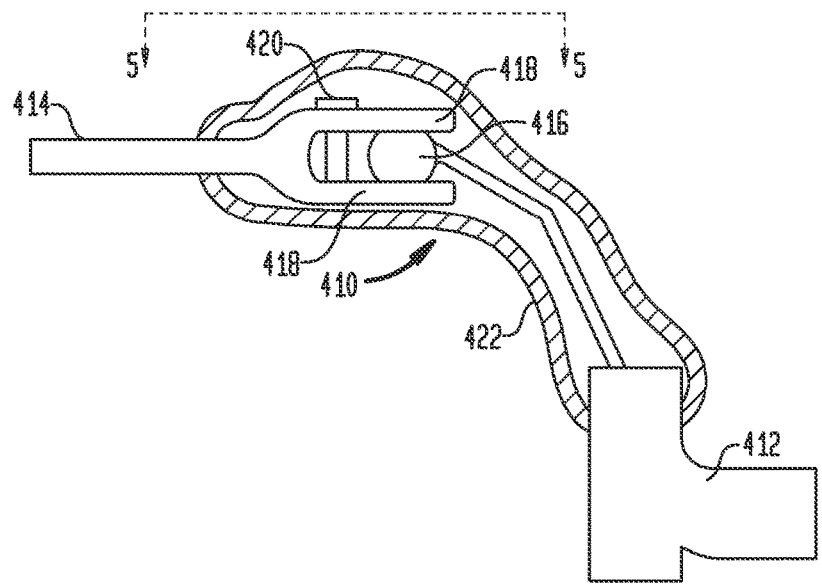
FIG. 4 is a side view schematic diagram, partially in section, of an adjustable coupling encapsulated in a membrane in accordance with the present technology.
Figure 5:
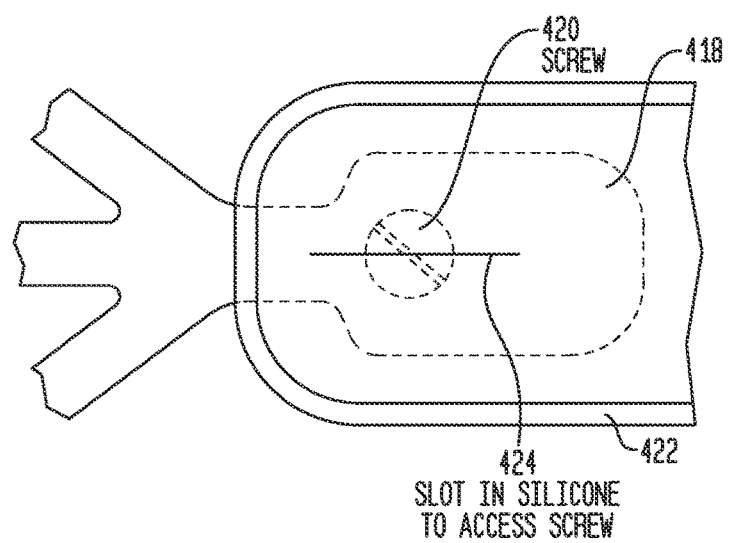
FIG. 5 is a top view of a portion of the membrane-encapsulated coupling of FIG. 4.

Actuator positioning mechanisms can be very effective, but they are sometimes difficult to manipulate and adjust. FIGS. 4 and 5 depict a tool-position/orientation adjustment component 410 between two mechanical structural components 412, 414, where one of the two components 412 and 414 would be coupled to an electromechanical actuator and the other would be anchored or directly or indirectly coupled to an anchored component of the device, such as a fixation system (FIGS. 3A and 3B). Position/orientation adjustment component 410 includes a ball 416 clasped by arms 418 that are tightened around ball 416 by a screw 420. Position/orientation adjustment component 410 is encapsulated by a membrane 422 that surrounds the component 410 and sealingly engages mechanical structures 412, 414. A screwdriver (not shown) can be inserted through a slit 424 in membrane 422 so that screw 420 can be adjusted. Slit 424 may be self-closing or may be sealed with adhesive after completion of such a screw adjustment.

Figure 9:
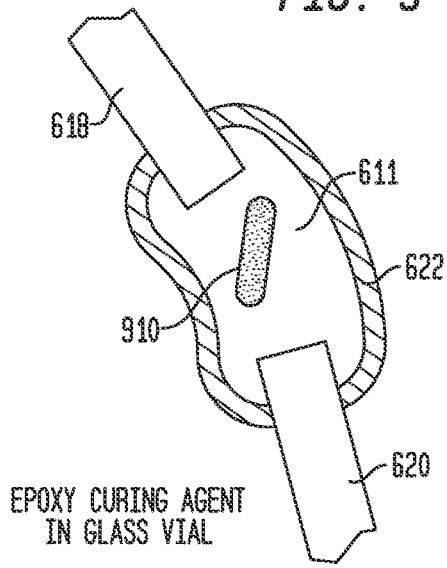
FIG. 9 is a schematic diagram, partially in section of an alternative embodiment of an epoxy-containing membrane of this invention with an included vial of hardener or catalyst.
Figure 10:
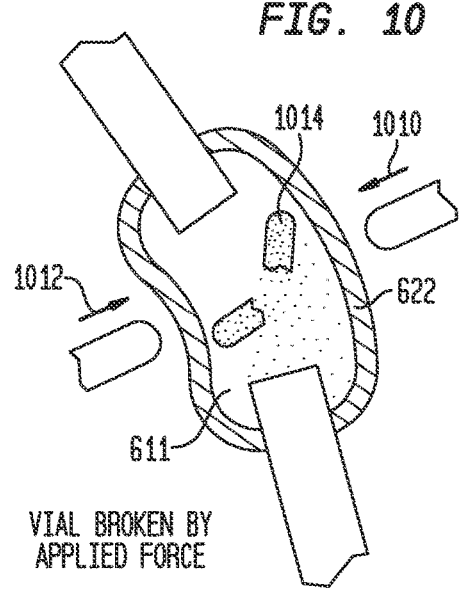
FIG. 10 depicts the application of force to break the vial in the embodiment of FIG. 9.

FIGS. 6, 7 and 8 depict a membrane 622 that is filled with a material 610 that is initially a liquid or other fluid (such as paste) within which ends 614 and 616 of joint members 618 and 620 are initially free to move, permitting joint members 618 and 620 to be positioned in a wide variety of angles and other orientations relative to each other. After such positioning has been achieved, the material 610 is caused to harden or solidify. An exemplary material 610 is silicone which is cured by the application of ultraviolet light 810 as depicted in FIG. 8 (material 610 is UV light hardening). An alternative exemplary material 611 is a two-part material such as epoxy resin that hardens when the parts are mixed, for example, by breaking a vial of hardener 910 as depicted in FIGS. 9 and 10.

Figure 15:
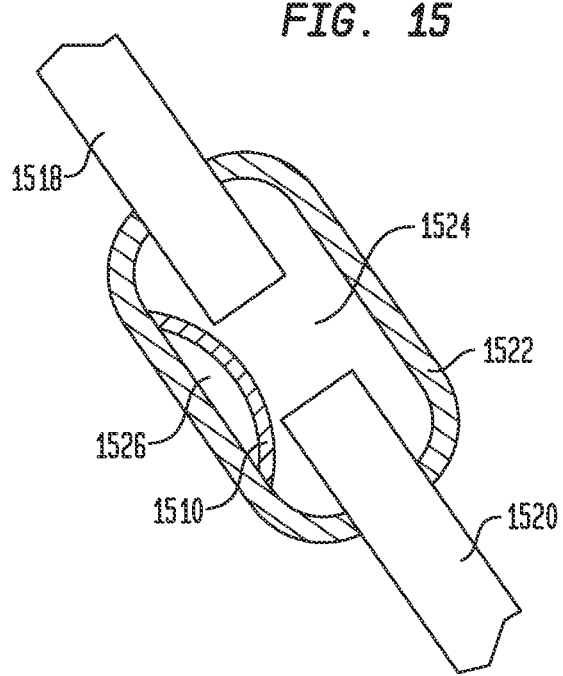
FIG. 15 is a schematic diagram, partly in section, of another membrane-encapsulated coupling.

As an alternative to a vial of hardener 912, a membrane wall 1510 (shown in FIG. 15) could divide the space within membrane 1522 with epoxy resin or another first material 1524 on one side of the wall 1510 and hardener, catalyst or another second material 1526 on the other. Membrane 1522 could be manipulated to cause the dividing membrane 1510 to rupture, allowing mixing of the two components 1526 and 1524.

Materials 610 and 611 may be silicone or epoxy being ultraviolet light-hardening, two part or other existing or future material that is initially fluid and subsequently hardens. Hardening can occur with the passage of time or can be made to harden when desired. Materials 1524 and 1526 on opposite sides of dividing membrane in FIG. 15 can likewise be epoxy resin and hardener, another material and a catalyst, or other two-component systems that are initially liquid and then solidify when mixed.

Following solidification of the materials 610, 611 or 1524 and 1526 as described above, the associated membrane 622 or 1522 can provide a smooth surface that does not promote retention and growth of microorganisms or biofilms. Under some circumstances, it may be possible to remove membrane 622 or 1522 leaving a smooth epoxy or other rigidified material that likewise will not promote retention and growth of microorganisms or biofilms.

Figure 11:
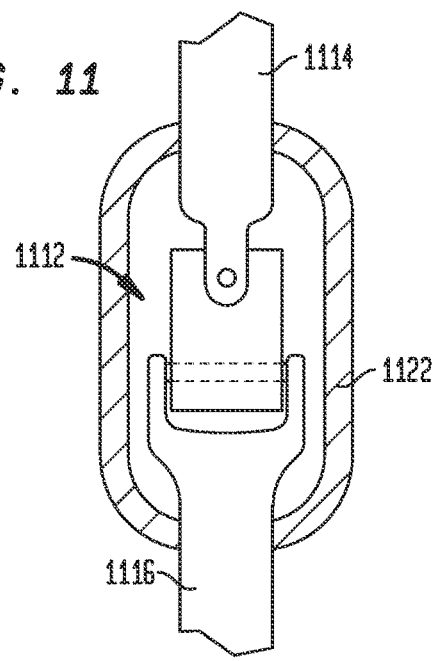
FIG. 11 is a top view, partially in section, of a membrane-encapsulated universal joint.
Figure 12:
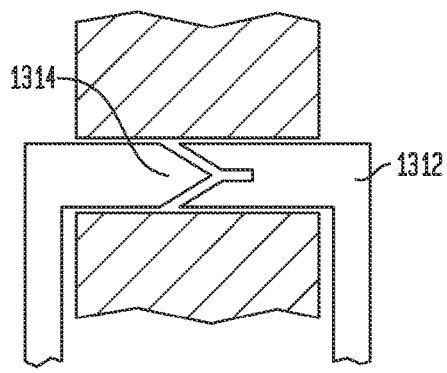
FIG. 12 and FIG. 13 depict "free" and "locked" joint components, respectively.
Figure 13:
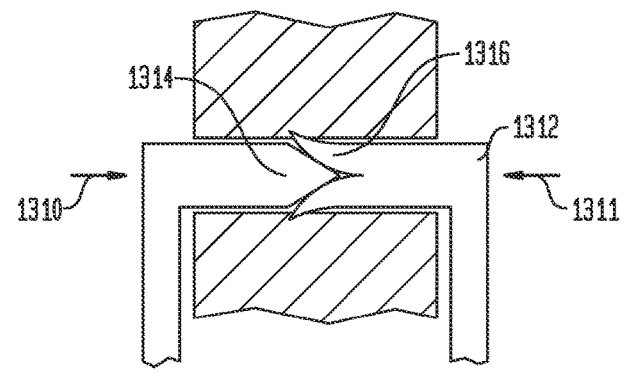

FIGS. 11, 12 and 13 depict a membrane 1122 encapsulated universal joint 1112 between a first component 1114 and second component 1116. Universal joint 1112 may be locked after desired positioning is achieved.

As an example, the universal joint 1112 may be locked, as schematically depicted in FIGS. 12 and 13, by application of opposed forces 1310 and 1312 driving locking members 1312 and 1314, thereby causing the end 1316 to flare as depicted in FIG. 13. Flared end 1316 engages surrounding joint member 1314, thereby locking end 1316 and joint member 1314 so that they cannot rotate or otherwise move relative to each other. Numerous other locking schemes would be usable with a universal joint like joint 1112. For instance, the membrane 1122 could be filled with epoxy or other hardenable material that is caused to harden or permitted to harden after joint 1112 is positioned as desired.

Figure 14:
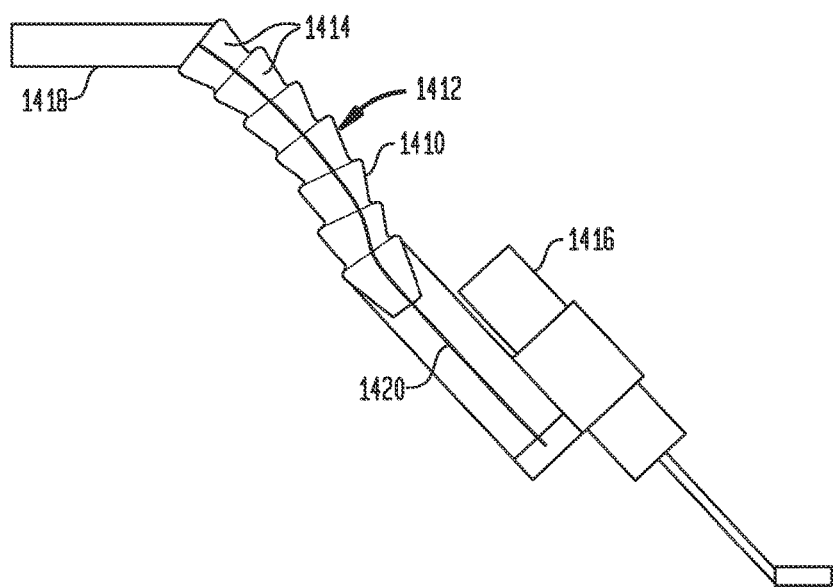
FIG. 14 is a schematicized elevation view of a lockable, membrane encapsulated stacked truncated cones joint embodiment of the technology.

Yet another alternative embodiment of this invention is depicted in FIG. 14, in which a nested stack 1412 of truncated cones 1414 covered by membrane 1410 form a coupling between an actuator 1416 and an individual's cranium 1418 or other appropriate anchoring structure. After actuator 1416 has been positioned as desired, wire 1420 inside of the stack 1412 of cones 1414 is tensioned, thereby locking the nested stack 1412 in position.

As will be appreciated by reference to the Figures and corresponding description above, some embodiments of the present invention, such as those depicted in FIGS. 4 and 5, involve manipulation of portions of the implant structure with screwdrivers or other tools in order to position the implant components as desired. Because of the small size, the geometry and other factors, this direct manipulation of joint components can be difficult. Other of the exemplary embodiments of the present technology depicted in the drawings and or described above function by more directly placing components as desired and then solidifying the coupling between the components, such as by hardening epoxy or another suitable material to lock portions of the components in desired relative positions.

As an alternative to direct adjustment of couplings, and when solidifying materials are used to lock the relative positions of components once placed in those positions, a placement structure such as the one schematically depicted in FIG. 16 may be used. As one example of such a device, a reference structure 1610 would be temporarily positioned relative to an individual's skull (not shown) with contact at contact points 1612. A robotic arm 1614 mounted on reference structure 1610 holding an actuator 1616 could then position actuator 1616 within an appropriate cavity 1618. After a desired position for actuator 1616 (or another component requiring precise positioning) is achieved, a coupling located (directly or indirectly) between the actuator 1616 (or other component requiring precise positioning) and an attachment structure could be rigidified as depicted in, for instance, FIGS. 6-10 and 14. The robotic arm 1614 and reference structure 1610 could then be removed, and the rigidified coupling would hold the components in position.

Different arrangements are possible of the components depicted in the drawings or described above, as well as components and steps not shown or described. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present technology is not limited to the embodiments described above or depicted in the drawings, and various embodiments and modifications can be made without departing from the scope of the claims below and their equivalents. For instance, a number of different materials in addition to silicone may be usable to encapsulate components with complex surfaces. Such materials may be formed as sheets, tubes, capsules or other shapes and then positioned around the prosthetic components as described above, in some instances (but not always) using adhesive. Alternatively, such a barrier may be formed in place encapsulating the prosthetic components. Formation of a smooth-surfaced capsule may be accomplished using a mold to contain liquid or another fluid until it solidifies. Alternatively, some such materials that naturally form a smooth-surfaced mass may be formed in place without the need for a mold.

What is claimed is:

1. An implantable medical device, comprising:
   a positioning mechanism configured to be connected to a component of the implantable medical device and to an anatomical structure; and
   a membrane configured to substantially encapsulate at least a portion of the positioning mechanism,
   wherein the device includes an actuator located outside the volume encapsulated by the membrane.

2. The device of claim 1, wherein the device is a middle ear implant and further wherein the component is an actuator of the middle ear implant.

3. The device of claim 1, wherein the positioning mechanism comprises a position/orientation adjustment component configured to be connected to a first mechanical structure also configured to be connected to the component, and to a second mechanical structure configured to be anchored relative to the anatomical structure; and
   wherein the portion of the positioning mechanism encapsulated by the membrane includes the position/orientation adjustment component.

4. The device of claim 3, wherein the position/orientation adjustment component comprises a ball and socket structure, and wherein the device is a middle ear implant and further wherein the component is an actuator of the middle ear implant.

5. The device of claim 4, wherein the ball and socket structure is disposed on abutting ends of the first and second mechanical structures, and wherein moving components of the ball relative to the socket and/or visa-versa are encapsulated by the membrane.

6. The device of claim 3, wherein the position/orientation adjustment component comprises a universal joint structure, and wherein the device is a middle ear implant and further wherein the component is an actuator of the middle ear implant.

7. The device of claim 3, wherein the position/orientation adjustment component comprises a lockable jointed arm.

8. The device of claim 3, wherein the membrane is formed of silicone.

9. The device of claim 1, wherein the membrane is configured to be attached to the encapsulated portion of the positioning mechanism.

10. The device of claim 1, wherein the membrane contains at least one port through which a coupling adjustment tool can be inserted.

11. The device of claim 1, further comprising:
    an implantable component having at least one surface to which microorganisms can attach, wherein the membrane is configured to substantially encapsulate the least one surface, wherein the membrane is attachable to the implantable component so as to substantially prevent microorganisms from traveling into the encapsulated portion, thereby inhibiting the attachment of microorganisms on the at least one surface of the implantable component.

12. The device of claim 11, wherein the positioning mechanism is formed at least in part of polymeric material.

13. The device of claim 12, wherein the polymeric material is epoxy.

14. The device of claim 13, wherein the epoxy comprises a first part and a second part and wherein the membrane is configured to physically separate the first and second parts of the epoxy.

15. The device of claim 14, wherein one of the first and second parts is separated from the other of the first and second parts by a frangible wall dividing the inside of the membrane into two chambers.

16. The device of claim 1, further comprising:
    an implantable component having at least one surface to which microorganisms can attach, wherein the membrane is configured to substantially encapsulate the least one surface, the membrane having an aperture through which the implantable component passes to define a non-encapsulated portion of the implantable component, wherein the portion of the membrane forming the aperture is attachable to the implantable component so as to substantially prevent microorganisms from traveling through the aperture, thereby inhibiting the attachment of microorganisms on the at least one surface of the implantable component, and wherein the membrane encapsulates an articulating joint of the positioning mechanism.

17. The device of claim 1, wherein the membrane encapsulates at least a portion of the positioning mechanism, and wherein the membrane encapsulates all surfaces of the positioning mechanism that both move relative to one another and are in direct contact with one another.

18. The device of claim 1, wherein the membrane encapsulates only a portion of the positioning mechanism, and wherein all articulating components of the positioning mechanism are encapsulated by the membrane.

19. The device of claim 1, wherein:
    the positioning mechanism includes a first structural component and a second structural component connected to the first structural component, the connection being located between a portion of the positioning mechanism configured to be connected to the component of the implantable medical device and a portion of the positioning mechanism configured to be connected to the anatomical structure;
    the membrane encapsulates portions of the first structural component and the second structural component such that the connection is also encapsulated; and
    the positioning mechanism is configured such that the first structural component is movable relative to the second structural component away from the second structural component.

20. The device of claim 1, wherein:
    the positioning mechanism includes a first structural component and a second structural component separate from the first structural component and movably connected to the first structural component, the connection being located between a portion of the positioning mechanism configured to be connected to the component of the implantable medical device and a portion of the positioning mechanism configured to be connected to the anatomical structure;

the first structural component extends away from the connection in a first direction and the second structural component extends away from the connection in a second direction that is at least about normal from the first direction and also lying on a plane oblique to a plane on which the first direction lies;

the membrane encapsulates portions of the first structural component and the second structural component such that the connection is also encapsulated; and the positioning mechanism is configured such that the first structural component is movable relative to the second structural component.

21. The device of claim 1, wherein the device is a middle ear implant and wherein the device is configured to be directly connected to a cochlea of a recipient of the implantable medical device.

22. The device of claim 1, wherein the device includes an actuator and is configured to be implanted in a recipient such that the actuator is directly connected to a cochlea of the recipient.

23. The device of claim 1, wherein:
a cavity is located between a portion of the positioning mechanism and the membrane.

24. The device of claim 1, wherein the membrane encapsulates a liquid that is configured to be hardened.

25. The device of claim 1, wherein:
the positioning mechanism comprises a lockable jointed arm; and
the membrane encapsulates a jointed portion of the lockable jointed arm.

26. The device of claim 1, wherein the device is a middle ear implant and further wherein the component is an actuator of the middle ear implant and wherein the positioning member is configured to move the actuator in a manner completely separately from movement that results from actuation of the actuator.

27. An implantable medical device, comprising:
a positioning mechanism configured to be connected to a component of the implantable medical device and to an anatomical structure; and
a component formed as one of a flexible sheet, a flexible tube or a flexible capsule configured to substantially encapsulate at least a portion of the positioning mechanism, wherein
the implantable medical device includes an actuator of the implantable medical device separate from the positioning mechanism, wherein the actuator is the component of the implantable medical device.

28. The device of claim 27, wherein the component formed as one of a sheet, a tube or a capsule configured to substantially encapsulate at least a portion of the positioning mechanism encapsulates at least a portion of the positioning mechanism.

29. The device of claim 27, wherein:
the positioning mechanism includes a first structural component and a second structural component connected to the first structural component, the connection being a joint configured to enable the first structural component to articulate relative to the second structural component;
the joint is located between a portion of the positioning mechanism configured to be connected to the component of the implantable medical device and a portion of the positioning mechanism configured to be connected to the anatomical structure; and
the component formed as one of a sheet, a tube or a capsule configured to substantially encapsulate at least a portion of the positioning mechanism encapsulates the joint.

30. The device of claim 27, wherein:
the component is formed as one of a flexible tube.

31. The device of claim 27, wherein:
the implantable medical device includes a functional component of the implantable medical device separate from the positioning mechanism, wherein the functional component is the component of the implantable medical device.

* * * * *